(12) United States Patent
Angeletti et al.

(10) Patent No.: US 10,347,986 B2
(45) Date of Patent: Jul. 9, 2019

(54) RECONFIGURABLE RF FRONT END CIRCUIT FOR A MULTI-BEAM ARRAY FED REFLECTOR ANTENNA SYSTEM

(71) Applicant: European Space Agency (ESA), Paris (FR)

(72) Inventors: Piero Angeletti, Noordwijk (NL); Francesc Coromina, Noordwijk (NL); Piero Gabellini, Noordwijk (NL); Nicola Gatti, Noordwijk (NL)

(73) Assignee: European Space Agency (ESA), Paris (FR)

( * ) Notice: Subject to any disclaimer, the term of this patent is extended or adjusted under 35 U.S.C. 154(b) by 0 days.

(21) Appl. No.: 15/559,064

(22) PCT Filed: Mar. 19, 2015

(86) PCT No.: PCT/EP2015/055807
§ 371 (c)(1),
(2) Date: Sep. 18, 2017

(87) PCT Pub. No.: WO2016/146195
PCT Pub. Date: Sep. 22, 2016

(65) Prior Publication Data
US 2018/0076519 A1    Mar. 15, 2018

(51) Int. Cl.
*H01Q 1/28*     (2006.01)
*H01Q 3/26*     (2006.01)
(Continued)

(52) U.S. Cl.
CPC .......... *H01Q 3/2664* (2013.01); *H01Q 1/288* (2013.01); *H01Q 3/40* (2013.01); *H01Q 19/17* (2013.01);
(Continued)

(58) Field of Classification Search
CPC ........ H01Q 3/40; H01Q 3/2664; H01Q 1/288; H01Q 19/17
(Continued)

(56) References Cited

U.S. PATENT DOCUMENTS

| 5,115,248 A * | 5/1992 | Roederer | H01Q 3/2658 |
| | | | 342/368 |
| 6,993,299 B2 * | 1/2006 | Sugar | H01Q 3/28 |
| | | | 455/103 |

(Continued)

FOREIGN PATENT DOCUMENTS

| EP | 0473299 A2 | 3/1992 |
| EP | 1447922 A2 | 8/2004 |
| EP | 2296225 A1 | 3/2011 |

*Primary Examiner* — Lam T Mai
(74) *Attorney, Agent, or Firm* — N.V. Nederlandsch Octrooibureau; Catherine A. Shultz; Tamara C. Stegmann

(57) ABSTRACT

Reconfigurable RF front-end circuit for a multi-beam array fed reflector antenna system having a first plurality of $N_B$ input beam signals and a second plurality of $N_E$ radiating elements (RE), and method of operating such a front-end circuit.
The front-end circuit comprises a reconfigurable beam forming network (LLRBFN), having a set of $N_B$ input ports and distributing each input port signal to a plurality of $N_A$ output ports with phase and amplitude control, a plurality of $N_A$ high power amplifiers (HPA) connected to the plurality of $N_A$ output ports of the reconfigurable beam forming network (LLRBFN) and an output network (ONET, OSN), arranged for recombining signals output by the high power amplifiers (HPA) and feeding the recombined signals to the second plurality of $N_E$ radiating elements (RE). The high power amplifiers (HPA) are variable bias high power amplifiers (VB-HPA).

15 Claims, 5 Drawing Sheets

(51) Int. Cl.
  *H01Q 3/40* (2006.01)
  *H01Q 19/17* (2006.01)
  *H01Q 25/00* (2006.01)
  *H04B 7/185* (2006.01)
  *H04B 7/204* (2006.01)

(52) U.S. Cl.
  CPC ....... *H01Q 25/007* (2013.01); *H04B 7/18515* (2013.01); *H04B 7/2041* (2013.01)

(58) Field of Classification Search
  USPC .................................. 343/868; 342/373, 374
  See application file for complete search history.

(56) References Cited

U.S. PATENT DOCUMENTS

| | | | | |
|---|---|---|---|---|
| 2004/0224633 | A1* | 11/2004 | Coromina | H04B 7/1851 455/13.3 |
| 2005/0122264 | A1 | 6/2005 | Coromina | |
| 2011/0102263 | A1* | 5/2011 | Angeletti | H01Q 3/40 342/373 |

* cited by examiner

RECONFIGURABLE RF FRONT END CIRCUIT FOR A MULTI-BEAM ARRAY FED REFLECTOR ANTENNA SYSTEM

FIELD OF THE INVENTION

The present invention relates to a reconfigurable RF front-end circuit for a multi-beam array fed reflector antenna system having a first plurality of $N_B$ input beam signals and a second plurality of $N_E$ radiating elements (RE), the front-end circuit comprising a reconfigurable beam forming network (LLRBFN), having a set of $N_B$ input ports and distributing each input port signal to a plurality of $N_A$ output ports with phase and amplitude control; a plurality of $N_A$ high power amplifiers (HPA) connected to the plurality of $N_A$ output ports of the reconfigurable beam forming network (LLRBFN); and an output network (ONET, OSN), arranged for recombining signals output by the high power amplifiers (HPA) and feeding the recombined signals to the second plurality of $N_E$ radiating elements (RE).

In a further aspect, the present invention relates to a method of operating such an RF front-end circuit.

PRIOR ART

U.S. Pat. No. 6,993,299 discloses the use of variable bias HPA's in array antennae, however, using an a posteriori control of the variable bias.

U.S. Pat. No. 5,115,248 discloses a solid state power amplifier with dynamically adjusted operating points. The output power from such an RF High-Power-Amplifier can be adjusted by changing its bias conditions.

SUMMARY OF THE INVENTION

The present invention seeks to provide an improved RF front-end circuit, especially suitable for satellite applications, such as in the fields of satellite communications, remote sensing and global navigation systems.

According to the present invention, a reconfigurable RF front-end circuit according to the preamble defined above is provided, wherein the high power amplifiers (HPA) are variable bias high power amplifiers (VB-HPA). This allows to improve poor efficiency of the prior art amplification sections when amplitude and phase beam forming is applied, in order to achieve maximization of radiation performance.

In a further aspect, there is provided a method of operating a reconfigurable RF front-end circuit according to one of the present invention embodiments, comprising controlling the bias condition of each of the variable bias high power amplifiers (VB-HPA) individually. This allows to optimize operation in such a way that the amplitude and phase excitations of all the beams simultaneously satisfy the radiative required performances together with the constraint that the load for each amplifier is kept within a range that allow to operate the amplifier with a good DC-to-RF efficiency and the overall RF-Front-End in an optimum DC-to-EIRP efficiency condition.

SHORT DESCRIPTION OF DRAWINGS

The present invention will be discussed in more detail below, using a number of exemplary embodiments, with reference to the attached drawings, in which FIG. 1 shows a schematic diagram of a first embodiment of the front-end circuit according to the present invention;

DETAILED DESCRIPTION OF EXEMPLARY EMBODIMENTS

Figure 1:
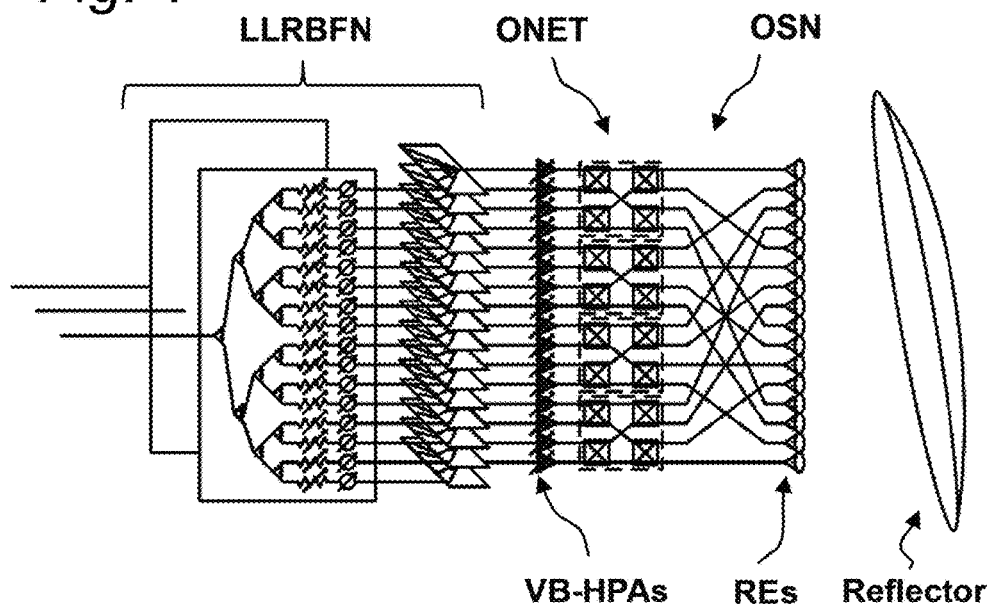

Satellite systems for multimedia broadcasting to mobiles have been proposed to adopt multiple shaped beams antennas realizing coverages, e.g. coinciding with different linguistic geographical regions.

Outstanding satellite performances are required to provide high data rates and quality of service to low-cost and small-size mobile terminals. Considering the noticeable effective aperture required in S-band from a geostationary orbit, the most promising antenna architecture is based on large size reflectors fed by complex arrays of radiating elements (RE), i.e. an Array Fed Reflector (AFR).

In multi-beam satellite payloads based on Array Fed Reflectors, the high power section is responsible for RF power generation and distribution to feeds. In a generic array fed reflector antenna system, the feed array comprises a plurality of radiating elements (REs) typically arranged in a regular grid pattern (e.g. on a hexagonal lattice). The feed array is located at a reflector focal plane or at an offset distance. The feed array produces a wavefront which is reflected off the reflector to a coverage area. Importantly, there is direct correspondence between each radiating element of the feed array and the elementary beam location produced by that radiating element on the coverage area.

The capability to realize very large reflectors apertures is just the first element to account for an effective design of the overall satellite payload architecture. An equally difficult task is that of assuring high RF power handling capability as well as flexibility in its allocation.

A fundamental goal that has been taken into consideration for the development of the present invention embodiments (also indicated below as architecture E), is the power utilization efficiency. The limited availability of power sources in satellites make it preferable for the on-board High Power Amplifiers (HPAs) to work close to the saturation point in order to improve the DC-to-RF power conversion efficiency and to take full advantage of their power-handling capabilities.

In allocating the power to the radiating elements RE in a multi-beam or reconfigurable antenna, if a radiating element is not participating to the formation of the beam due its position, its power would be wasted. By using Variable-Bias High-Power-Amplifiers (VB-HPAs) the power supplied to less-used amplifiers can be reallocated to other amplifiers providing useful contribution. In a Variable-Bias High-Power-Amplifier the bias can be adjusted to provide high efficiency in a wide range of RF output power.

Finally, by increasing the DC-to-EIRP efficiency, the required saturated power level of the HPAs can be reduced while still achieving the required EIRP levels.

Some or all aspects of the present invention may be suitable for being implemented in form of software, in particular a computer program product. Such computer program product may comprise a storage media, such as a memory, on which the software is stored. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single or multiple hardware items combining the features of the items described.

FIG. 1 illustrates a schematic diagram of a first embodiment of the front-end circuit according to the present invention as applied in a multi-beam array fed reflector antenna system.

The multi-beam array fed reflector antenna system of FIG. 1 comprises a low-level reconfigurable beam forming network (LLRBFN), a layer of variable bias high power amplifiers (VB-HPAs), a layer of lossless multiport hybrid matrices (output network, ONET), a fixed output scrambling network (OSN), a layer of radiating elements (REs), and a reflector. The layer of radiating elements (REs) has a number $N_E$ of radiating elements. Thus, in an embodiment of the present invention, a reconfigurable RF front-end circuit is provided for a multi-beam array fed reflector antenna system having a first plurality of $N_B$ input beam signals and a second plurality of $N_E$ radiating elements RE. The front-end circuit comprises a reconfigurable beam forming network LLRBFN, having a set of $N_B$ input ports and distributing each input port signal to a plurality of $N_A$ output ports with phase and amplitude control; a plurality of $N_A$ high power amplifiers HPA connected to the plurality of $N_A$ output ports of the reconfigurable beam forming network LLRBFN; an output network (ONET, OSN) arranged for recombining signals output by the high power amplifiers HPA and feeding the recombined signals to the second plurality of $N_E$ radiating elements RE. The high power amplifiers HPA are variable bias high power amplifiers VB-HPA.

The LLRBFN of FIG. 1 has a number $N_B$ of input ports and a number $N_A$ of output ports configured to receive a number $N_B$ of beam signals and to distribute them to a number $N_A$ of output ports. The number $N_B$ of input ports is equal to the number $N_B$ of input beams and each input port of the $N_B$ input ports is configured to receive one of the $N_B$ beam signals. The number $N_A$ of output ports is equal to the number $N_A$ of variable bias high power amplifiers (VB-HPAs). The LLRBFN of FIG. 1 is further configured to transmit an input injected into one of the input ports to $N_A$ different output ports.

The low-level reconfigurable beam forming network (LLRBFN) of FIG. 1 comprises a first layer of $N_B$ Signal Dividers SD, a second layer of $N_A \times N_B$ variable attenuators elements WE AMP, a third layer of $N_A \times N_B$ phase shifters elements WE, a forth layer of $N_A$ Signal Combiners SC for combining the signal channels into the plurality of $N_A$ output ports. Thus, in a first embodiment of the present invention, the reconfigurable beam forming network (LLRBFN) comprises a plurality of signal dividers (SD) for distributing each input port signal to a plurality of $N_A$ signal channels, each signal channel further comprising an amplitude weighting element (WE AMP) and a phase weighting element (WE PHI), and a plurality of $N_A$ signal combiners (SC) for combining the signal channels into the plurality of $N_A$ output ports.

The order of the amplitude and phase weighting elements can be interchanged, or amplitude and phase weighting may be implemented in an integrated weighting element.

The first layer of $N_B$ Signal Dividers SD of FIG. 1 has a number $N_B$ of input ports and a number $N_A \times N_B$ of output ports, and is configured to receive the $N_B$ input beam signals and to split each input signal in $N_A$ output signals.

The second layer of $N_A \times N_B$ variable attenuators elements WE AMP of FIG. 1 has a number $N_A \times N_B$ of input ports connected to the outputs of the layer SD and a number $N_A \times N_B$ of output ports.

The third layer of $N_A \times N_B$ phase shifters elements WE PHI of FIG. 1 has a number $N_A \times N_B$ of input ports connected to the outputs of the variable attenuators elements layer and a number $N_A \times N_B$ of output ports.

The forth layer of $N_A$ Signal Combiners (SC) has a number $N_A \times N_B$ of input ports for combining the signals at the output of the phase shifter layer into the plurality of $N_A$ output ports; and is configured in such a way that each signal combiner has $N_B$ input signals corresponding to each $N_B$ beam signals and combine them in an output signals.

The layer of variable bias high power amplifiers (VB-HPAs) of FIG. 1 comprises $N_A$ variable bias high power amplifiers each one having an input and an output. The $N_A$ inputs of the active variable bias high power amplifiers are connected to the $N_A$ output ports of the LLRBFN. The variable bias high power amplifier VB-HPA is a flexible or variable bias solid-state power amplifier (flex-SSPA) in a specific embodiment, or it can be implemented as a flexible or variable bias travelling wave tube amplifier (flex-TWTA).

The layer of lossless multiport hybrid matrices (ONET) of FIG. 1 comprises a plurality of lossless multiport hybrid matrices, a number $N_A$ of input ports and a number $N_E$ of output ports. Each lossless multiport hybrid matrix may be a Butler network (see description below) or any other suitable device. The number $N_A$ of input ports is equal to the number of variable bias high power amplifiers VB-HPA and each input port of the $N_A$ input ports is connected to a different output port of the $N_A$ output ports of the layer of variable bias high power amplifiers VB-HPA. The number $N_E$ of output ports of the ONET is equal to the number $N_E$ of radiating elements RE.

The fixed output scrambling network (OSN) of FIG. 1 connects each output port of the $N_E$ output ports of the ONET to a radiating element RE. The OSN interconnection between each lossless multiport hybrid matrix of the ONET and the radiating elements RE is such to obtain an almost uniform distribution of power among the amplifiers independently form the power assigned to the beams.

Figure 2:
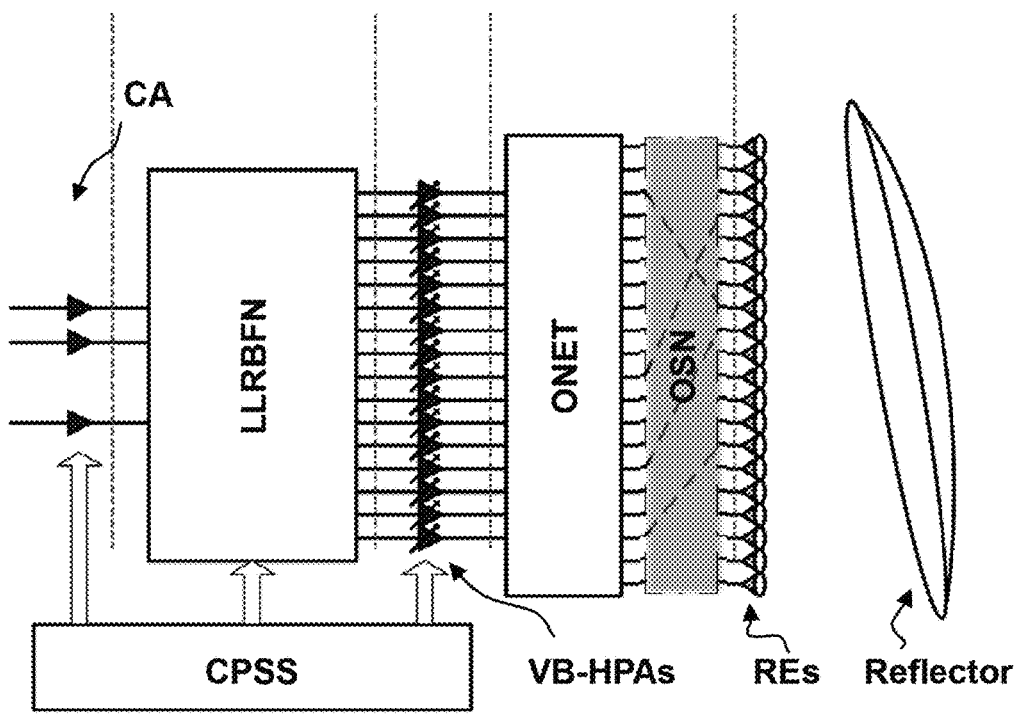
FIG. 2 shows a schematic diagram of a second embodiment of the front-end circuit according to the present invention.

FIG. 2 illustrates a schematic diagram of a second embodiment of the front-end circuit applied in a multi-beam array fed reflector antenna system according to a further embodiment of the present invention.

The multi-beam array fed reflector antenna system of FIG. 2 comprises a first layer of $N_B$ channel amplifiers CA (each with a voltage gain $a_m$), in addition to a low-level reconfigurable beam forming network (LLRBFN) (with voltage gains $b_{n,m}$), a layer of variable bias high power amplifiers (VB-HPAs, with normalised voltage gain $c_n$), a layer of lossless multiport hybrid matrices (output network, ONET), a fixed output scrambling network (OSN), a layer of radiating elements (REs), and a reflector (as in the FIG. 1 embodiment). Furthermore a control and power sub-system (CPSS) is provided connected to the reconfigurable beam forming network (LLRBFN) and the variable bias high power amplifiers (VB-HPA).

Each one of the $N_B$ channel amplifiers CA comprises one input configured to receive one of the $N_B$ beam signals and one output connected to the LLRBFN. Or in other words, the front-end circuit further comprises a set of channel amplifiers (CA) each connected to one of the set of $N_B$ input ports of the reconfigurable beam forming network (LLRBFN).

The LLRBFN of FIG. 2, similar to the embodiment of FIG. 1, has a number $N_B$ of input ports and a number $N_A$ of output ports, and is configured to receive the $N_B$ outputs of the CA and to transmit an input injected into an input port to $N_A$ different output ports. The layer of variable bias high power amplifiers (VB-HPAs), the layer of lossless multiport hybrid matrices (ONET), the fixed output scrambling network (OSN) and the layer of radiating elements (REs) of FIG. 2 are similar in structure and function to the VB-HPAs, the ONET, the OSN and the REs of FIG. 1.

The CPSS of FIG. 2 is configured to provide amplitude and phase settings for the LLRBFN and for the bias of the VB-HPA, and to supply a DC power associated to the LLRBFN and VB-HPA states, wherein the DC power is less than a power needed to simultaneously operate all the power amplifiers at full power.

In the FIG. 2 embodiment, the LLRBFN distributes the input beam signals to all the VB-HPAs with appropriate amplitude and phase. The ONET linearly recombines the amplified sub-signals and the OSN associates them to respective radiating elements REs. Finally, focusing means, e.g. a concave reflector, form the transmitted beams whose direction, shape and EIRP depends on the position of the radiating element RE within the array, on the applied amplitude and phase excitations and the bias conditions of the VB-HPAs. The cascade of the LLRBFN, VB-HPAs, ONETs and OSN, i.e. the reconfigurable RF front-end circuit, controls amplitude and phase excitations of the Radiating Elements REs.

Figure 3:
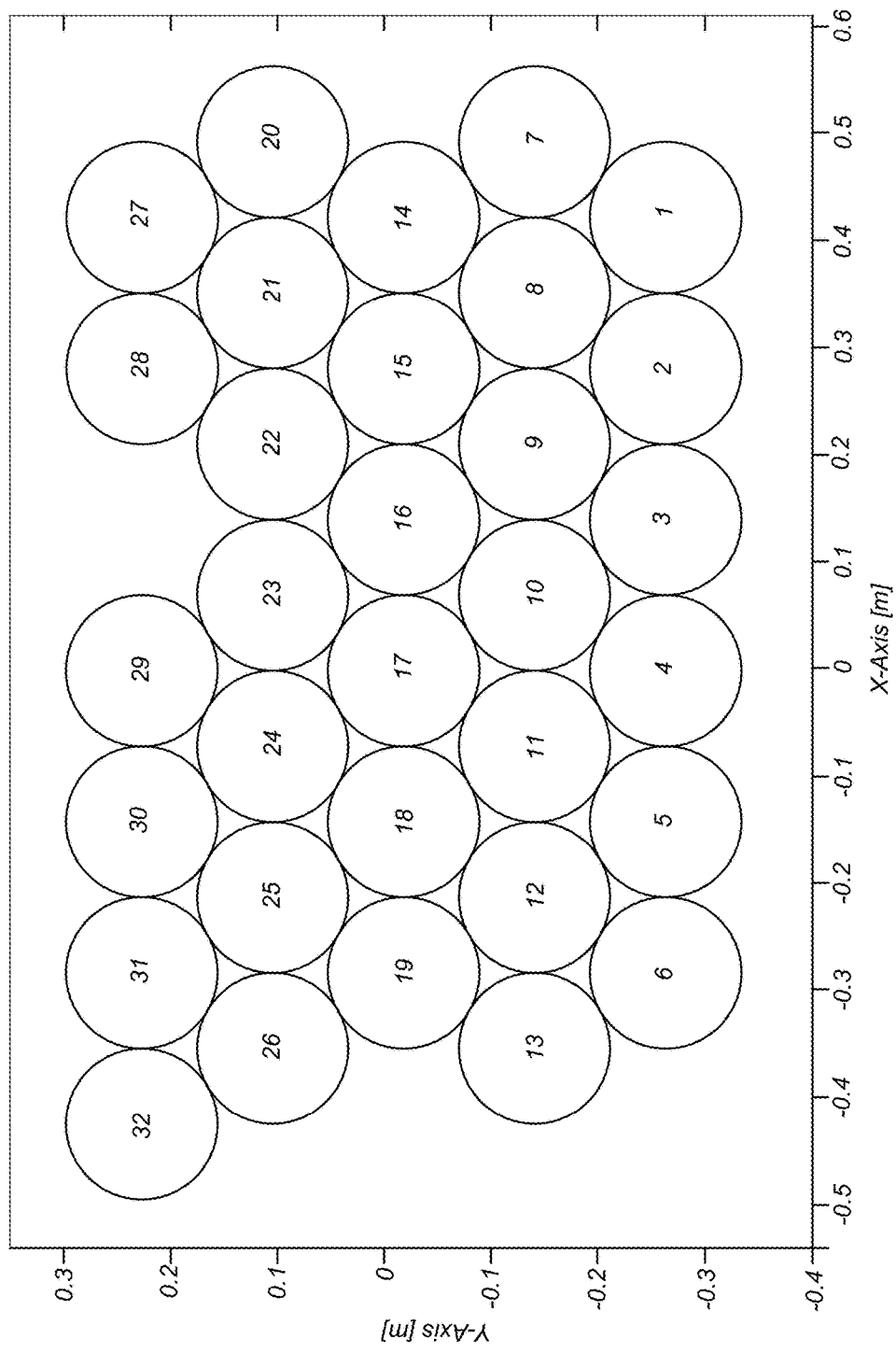
FIG. 3 shows a typical set-up of a plurality of radiating elements as used in an exemplary implementation of a multi-beam array fed reflector antenna system according to the present invention.

FIG. 3 illustrates a typical set-up of a plurality of radiating elements as used in an exemplary implementation of a multi-beam array fed reflector antenna system according to the present invention. This exemplary radiating elements configuration uses thirty two radiating elements. The target coverage shown in FIG. 3 may aim at covering different linguistic zones. The baseline number of radiating elements in FIG. 3 may be selected by an appropriate trade-off aimed at fitting the array with the target multi-beam coverage.

Figure 4:
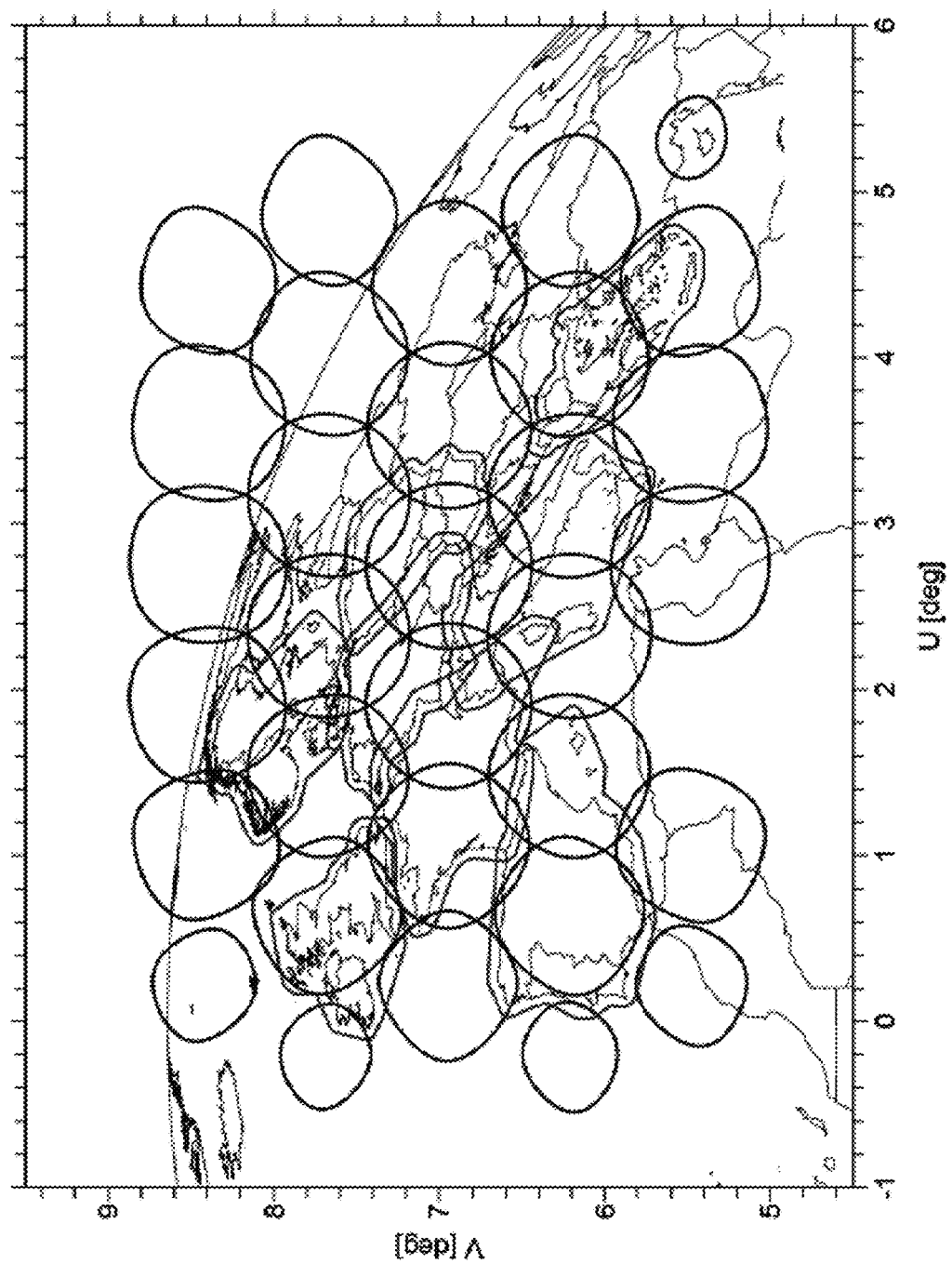
FIG. 4 shows the footprints of the elementary beams generated by the configuration of a plurality of radiating elements of FIG. 3.

FIG. 4 illustrates the footprint of the elementary beams generated by the configuration of thirty two radiating elements of FIG. 3, typical for a geostationary satellite covering the surface of Western Europe. The spherical coordinate system used in FIG. 4 refers to the satellite orbital location pointing toward the Earth centre, the horizontal and vertical axes represents the projections of the spherical versor along the north-south and east-west axes in degrees. A thirty two radiating elements array may offer a good solution for reconfiguration over a large orbital sector since as it can be seen in FIG. 4, the footprint of the elementary beams generated by the radiating elements supply an acceptable coverage all over the required angular sector due to a proper reflector (or platform) repointing depending on the selected satellite position. The reconfiguration capability related to the satellite position may be managed by means of antenna re-pointing while the reconfiguration capability related to the beam shaping within the service area may be managed optimizing both the beam forming network weights and the amplifier biasing conditions.

The baseline RF-Front-End circuit and Antenna architecture used for the configuration of RE's in FIG. 3 and FIG. 4 is similar to the one illustrated in FIG. 1 and FIG. 2.

Within the target area (Western Europe in the example), the service is provided by means of shaped beams covering a given region or language homogeneous area.

Figure 5:
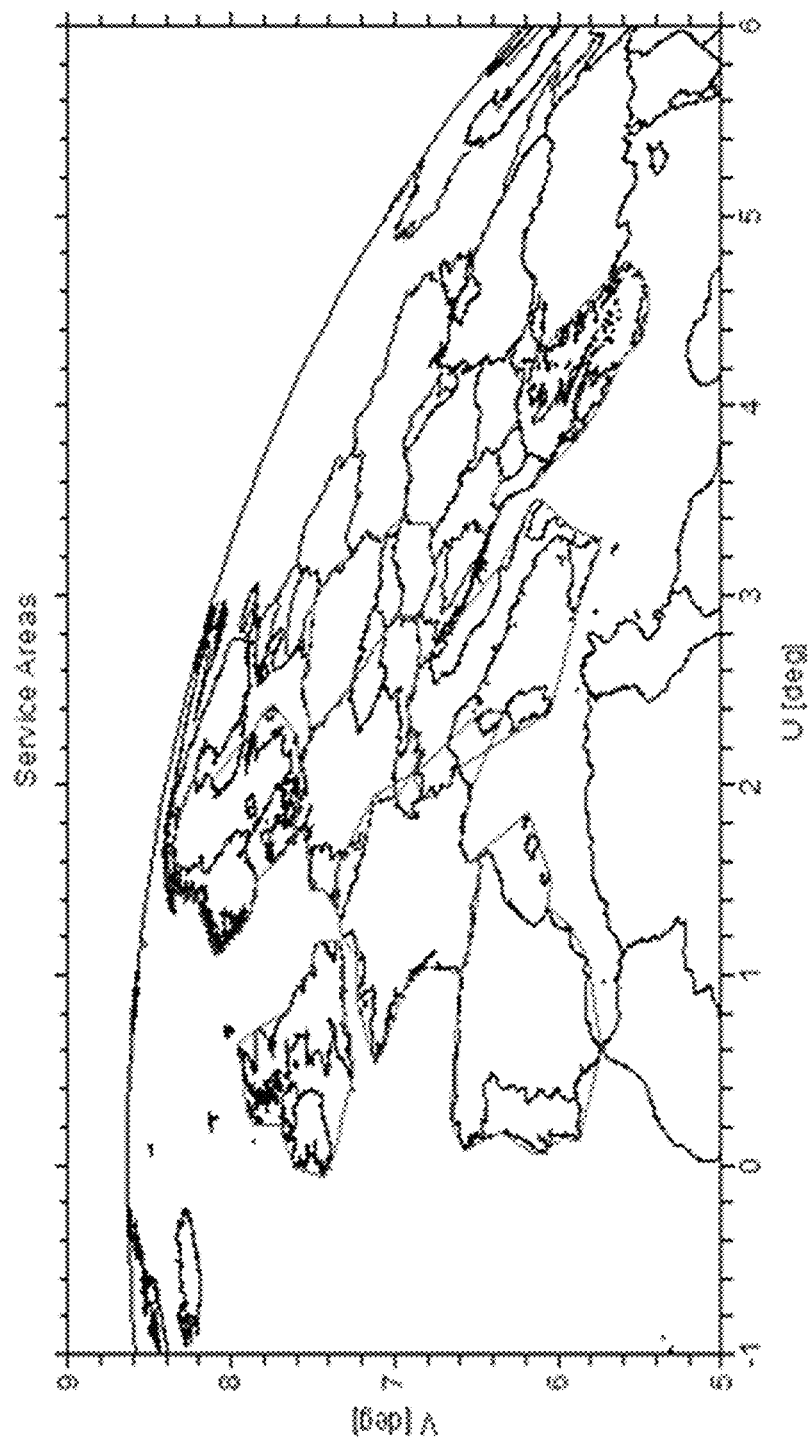
FIG. 5 shows an exemplary coverage with different shaped beams to be realised by appropriately amplitude and phase combining the elementary beams of FIG. 4.

FIG. 5 illustrates an exemplary Western Europe coverage with different shaped beams. The shaped beams are formed by means of appropriately amplitude and phase combining individual elementary beams.

Figure 6:
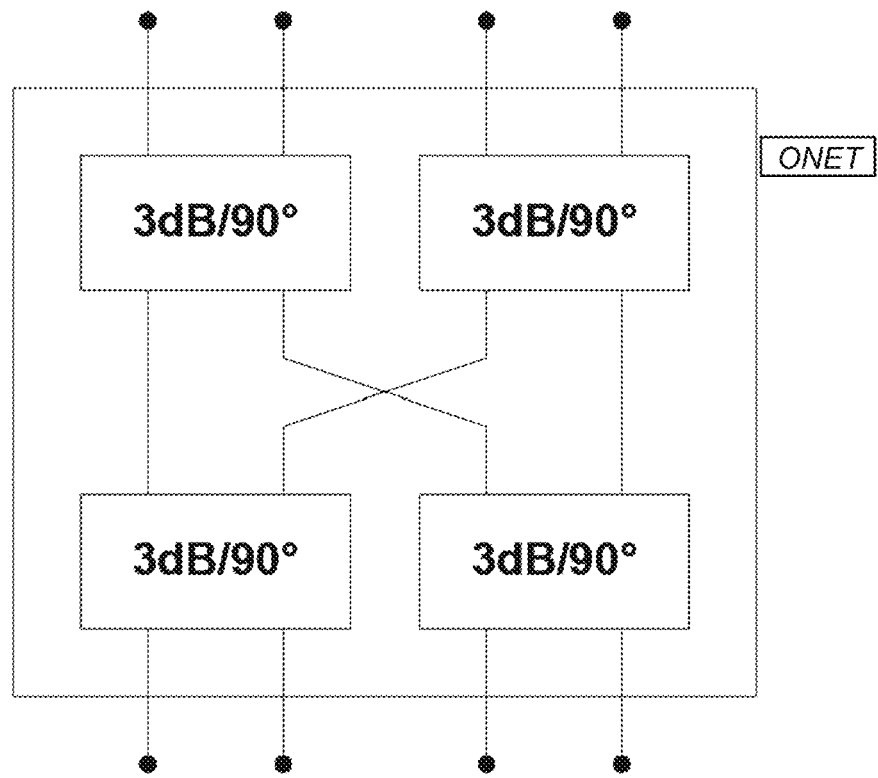
FIG. 6 shows an embodiment of an output network as can be applied for feeding the radiating elements.

FIG. 6 illustrates an exemplary 4×4 hybrid matrix constituting the ONET as possibly used in the embodiments of FIG. 1 and FIG. 2, as well as in the embodiment of FIG. 6 described below. The hybrid matrix of FIG. 6 has four inputs, four outputs, and four directional coupler blocks of 3 dB/90 degrees. As it can be seen in FIG. 6, the hybrid matrix linearly combines and phase shifts the inputs.

The OSN interconnection between each lossless multiport hybrid matrix of the ONET and the radiating elements RE is such to obtain an as uniform as possible distribution of power among the amplifiers independently form the power assigned to the individual beams.

The table below illustrates an exemplary OSN interconnection of a plurality of lossless multiport hybrid matrices of FIG. 6 to obtain an almost uniform distribution of power among the amplifiers for elementary beam of FIG. 4 and the shaped beams exemplified in FIG. 5 as used in the embodiments of FIG. 1 and FIG. 2.

| Lossless multiport hybrid matrix | Radiating Elements |
|---|---|
| A | 1, 5, 16, 30 |
| B | 2, 17, 28, 32 |
| C | 3, 14, 18, 27 |
| D | 4, 15, 19, 29 |
| E | 6, 10, 21, 25 |
| F | 7, 11, 22, 26 |
| G | 8, 12, 23, 31 |
| H | 9, 13, 20, 24 |

In view of the above, it is clear that the present invention also extends to a further aspect, i.e. a multi-beam array fed reflector antenna system comprising a first plurality of $N_B$ input beam signal inputs, an RF front-end circuit according to any one of the embodiment described herein, and further comprising a reflector receiving radiated signals from the second plurality of $N_E$ radiating elements (RE).

From a mathematical point of view, the relationship between signals at the input ports and signals at the output ports of the RF front end circuit embodiments of FIGS. 1, 2 and 6 can be expressed generally by the equation:

$$y = Tx$$

wherein x is the ($N_B \times 1$) input signal vector, y is the ($N_E \times 1$) output signal vector and T is the input-output ($N_E \times N_B$) transfer matrix.

The LLRBFN has maximal reconfigurability. The set of output ports $N_A$ is equal to the number of high power amplifiers, and the LLRBFN is configured to transmit an input signal injected into an input port to $N_A$ different output ports.

In a different embodiment of the invention the LLRBFN, or the combination of the CA and LLRFBFN, can be built as a Digital Beamforming Network (DBFN).

The cascade of the LLRBFN and the high power amplifiers can be modelled by an equivalent complex signal transfer matrix G with entries of square module normalized to the HPAs' saturated powers $P_n^A$, as:

$$g_{n,m} = c_n b_{n,m} a_m \exp(j\phi_{n,m}) \quad (1)$$

The RF-power at the output port of the n-th High Power Amplifier, $P_n^A$, assuming uncorrelated beam signals, is $$P_n^A \approx P_n^{SAT} \sum_{m=1}^{N_B} |g_{n,m}|^2 = \\ = P_n^{SAT} c_n^2 \sum_{m=1}^{N_B} b_{n,m}^2 a_m^2 \quad (2)$$

where $P_n^{SAT}$ is a reference power level for the n-th High Power Amplifier that will be assumed to correspond to the maximum deliverable power (e.g. saturation). The RF-power at the input port of the n-th High Power Amplifier, $P_n^{A-IP}$, is:

$$P_n^{A-IP} \approx \sum_{m=1}^{N_B} b_{n,m}^2 a_m^2 \quad (3)$$

The gain of a power amplifier is the ratio of the output RF-power to the input RF-power, and for the n-th High Power Amplifier:

$$\frac{P_n^A}{P_n^{A-IP}} = c_n^2 \quad (4)$$

The available power for the m-th beam, $P_m^B$, is:

$$P_m^B \approx \sum_{n=1}^{N_A} P_n^{SAT} |g_{n,m}|^2 = \\ = a_m^2 \sum_{n=1}^{N_A} P_n^{SAT} c_n^2 b_{n,m}^2 \quad (5)$$

For the total RF power we have, equivalently, $$P_{TOT} = \sum_{n=1}^{N_A} P_n^A = \sum_{n=1}^{N_A} \left( P_n^{SAT} c_n^2 \sum_{m=1}^{N_B} b_{n,m}^2 a_m^2 \right) = \\ = \sum_{m=1}^{N_B} P_m^B = \sum_{m=1}^{N_B} \left( a_m^2 \sum_{n=1}^{N_A} (P_n^{SAT} c_n^2 b_{n,m}^2) \right) \quad (6)$$

The overall transfer matrix T between the beam input ports and the input ports of the radiating elements (RE-IP) can be represented as the matricial product, $$T = HPG \quad (7)$$

where
P is the diagonal matrix with entries $\sqrt{P_n^{SAT}}$
G is the complex transfer matrix of the cascade of the channel amplifiers (CA), low-level reconfigurable BFN (LLRBFN) and high power amplifiers (HPAs)
H is the complex transfer matrix of the cascade of the layer of lossless multiport hybrid matrices (ONET), and the Output Scrambling Network (OSN) representing the ONET-to-RE mapping (i.e. in effect a permutation matrix).

A power amplifier efficiency is defined as the ratio of the output RF-power of a power amplifier to the DC-power it consumes. The amplification process introduces nonlinearities that affect the quality of the signal. For this reason, the operating point of the power amplifiers must be selected by trading efficiency versus linearity. Basically, the output power of power amplifiers can be controlled by changing the input power level.

Furthermore, in variable bias high power amplifiers (VB-HPAs), for a desired maximum output power, the efficiency can be controlled by adjusting the bias condition of the power amplifier. The power consumption of the power amplifier results are thus determined by the combination of the power amplifier bias conditions and output power. Thus in a general aspect of the present invention, a method is provided of operating an RF front-end circuit according to any one of the embodiments described above, comprising controlling the bias condition of each of the variable bias high power amplifiers (VB-HPA) individually.

To quantify these effects we must introduce quantities related to the actual operating point of the amplifier VB-HPA.

The first parameter, referred to as Saturation Back-Off (SBO) is defined as the ratio of the maximum achievable saturation power, $P_n^{SAT}$ with the given power amplifier, to the adjustable saturation power $P_n^{ASAT}$ according to the adjustable biasing conditions.

$$SBO_n = \frac{P_n^{SAT}}{P_n^{ASAT}} \quad (8)$$

By adjusting the saturation power of each power amplifier according to changing power requirements the efficiency of each power amplifier can be optimized. So, in a further method embodiment, the bias condition is controlled to vary a saturation back-off (SBO) parameter according to an actual power requirement of each of the variable bias high power amplifiers (VB-HPA) individually, the saturation back-off parameter (SBO) being defined as the ratio of a maximum achievable saturation power to an adjustable saturation power. Consequently, one or more of the power amplifiers can be operated at different Saturation Back-Off (SBO) values related to the output power actually needed for the power amplifier in consideration.

The other parameter is the Output Back-Off (OBO) defined as the ratio of the actual saturation power of the amplifier (i.e. the adjustable saturation power) to the output power in the operational condition under consideration.

$$OBO_n = \frac{P_n^{ASAT}}{P_n^A} \quad (9)$$

Thus, a further embodiment is provided, wherein the bias condition is controlled to vary an output back-off (OBO) parameter for each of the variable bias high power amplifiers (VB-HPA) individually, the output back-off parameter (OBO) being defined as the ratio of an adjustable saturation power to the actual output power.

The two quantities can be combined together in the following formula, $$P_n^A = \frac{P_n^{SAT}}{OBO_n SBO_n} \quad (10)$$

The amplifier power consumption, $W_n^A$, will depend on $$W_n^A = W_n^A(P_n^A, P_n^{ASAT}) = W_n^A(OBO_n, SBO_n) \quad (11)$$

It is worth noting that the linearity performances of a power amplifier are dominated by the OBO much more than by the SBO.

Generally speaking, to maintain a certain signal quality (e.g. defined by the ratio of the useful signal power to the intermodulation products power), a minimum Output Back-Off ($OBO_{min}$) must be exceeded, $$OBO_{min} \leq \min_n(OBO_n) \quad (12)$$

and substituting, $$\max_n(P_n^A) \leq \frac{P_n^{SAT}}{OBO_{min}} \quad (13)$$

Thus, in a further embodiment, the output back-off (OBO) parameter of the plurality of $N_A$ variable bias high power amplifiers (VB-HPA) is equal to or higher than a minimum output back-off parameter value ($OBO_{min}$).

In these expressions it is assumed that the linearity performances of the different amplifiers VB-HPA (possibly with different saturation powers) are similar in term of OBO such that a single value of Minimum Output Back-Off, $OBO_{min}$, can be determined. Nevertheless these expressions can be easily extended considering the need of different values of Minimum Output Back-Offs per amplifier.

Considering that the adjustment of the saturated power of a High Power Amplifier can be achieved with a negligible degradation in efficiency within a limited range (e.g. 3-4 dB saturation power control in space qualified Travelling Wave Tube Amplifiers—TWTAs), it is desirable (or mandatory due to the technological constraints) to limit the Saturation Back-Off (SBO) to a maximum value, $$\max_n(SBO_n) \leq SBO_{max} \quad (14)$$

Or, in a further method embodiment, the saturation back-off (SBO) parameter for each of the plurality of $N_A$ variable bias high power amplifiers (VB-HPA) is equal to or lower than a maximum saturation back-off parameter value ($SBO_{max}$).

Also in this case it is assumed that the Maximum Saturation Back-Off, $SBO_{max}$ of different amplifiers (possibly with different saturation powers) is identical. Similarly to what is noted above these expressions can be easily extended considering the need of different values of Maximum Saturation Back-Off per different amplifier classes.

Considering that the power amplifier efficiency is typically a monotone decreasing function of the Output Back-Off, the output power per amplifier should preferably satisfy the condition:

$$P_n^A = \frac{P_n^{ASAT}}{OBO_{min}} \quad (15)$$

which in summary reads, $$\frac{P_n^{SAT}}{OBO_{min} SBO_{max}} \leq P_n^A \leq \frac{P_n^{SAT}}{OBO_{min}} \quad (16)$$

and substituting, $$\frac{1}{OBO_{min} SBO_{max}} \leq c_n^2 \sum_{m=1}^{N_B} b_{n,m}^2 a_m^2 \leq \frac{1}{OBO_{min}} \quad (17)$$

Thus in a further embodiment, the saturation back-off parameter for each of the plurality of $N_A$ variable bias high power amplifiers (VB-HPA) is set according to formula (17) wherein n denotes an index for each of the plurality of $N_A$ variable bias high power amplifiers (VB-HPA), m denotes an index for each of the plurality of $N_B$ input beams, $a_m$ is the gain contribution of the respective channel amplifier CA, $b_{n,m}$ is the gain contribution of the respective reconfigurable beam forming network (LLRBFN), and $c_n$ is the gain contribution of the variable bias high power amplifier (VB-HPA).

It is assumed that the output power of each amplifier may not be the same for all the power amplifiers, and may vary with changes. Any given power amplifier may be required to amplify at an output power level up to a maximum saturation power level. For $N_A$ amplifiers the total available RF power could reach the sum of the maximum saturation power levels of each single amplifier (under the linearity constraint).

$$P_{TOT} = \sum_{n=1}^{N_A} P_n^A \leq \frac{1}{OBO_{min}} \sum_{n=1}^{N_A} P_n^{SAT} \quad (18)$$

This equality must hold to reach the maximum deliverable power limit (i.e. the power per amplifier must be compliant with the minimum back-off constraint).

The radiative performances of the antenna are also taken into account. Each of the $N_E$ Radiating Elements (RE) generates a co-polar far-field voltage pattern $f_k(\vartheta,\phi)$ (beamlet) normalized, for convenience, to a total power of $4\pi$ watts which means that the integrated power over the sphere becomes:

$$\iint_{4\pi} |f_k(\vartheta,\varphi)|^2 d\Omega = 4\pi \quad (19)$$

This normalisation is convenient since the feed directivity is then simply given by $|f_k(\vartheta,\phi)|^2$.

Each Radiating Elements (RE) is fed by an excitation coefficient $t_{k,m}$. The normalised voltage beam pattern, $$B_m(\vartheta,\varphi) = \frac{1}{\sqrt{\sum_{k=1}^{N_E} |t_{k,m}|^2}} \sum_{k=1}^{N_E} t_{k,m} f_k(\vartheta,\varphi) \quad (20)$$

is such that, if power coupling between the Radiating Elements can be neglected (as it is typically the case), the beam directivity is simply given by $|B_m(\vartheta,\phi)|^2$.

Assuming that the cascade of the ONET and the scrambling matrix representing the ONET-to-RE mapping satisfies a lossless condition (neglecting the Ohmic dissipative losses) and assuming the coupling effects between the radiating Elements to be negligible, the power available for the m-th beam would be conserved at the output of the stack of High Power Amplifiers (A-OP) and at the input ports of the radiating elements (RE-IP) such that the following relation holds true, $$\sum_{k=1}^{N_E} |t_{k,m}|^2 = P_m^B \quad (21)$$

Combining equation (20) with equation (21) we obtain that the Effective Isotropic Radiated Power (EIRP) of the m-th beam can be expressed as follows:

$$EIRP_m(\vartheta, \varphi) = P_m^B |B_m(\vartheta, \varphi)|^2 = \left| \sum_{k=1}^{N_E} t_{k,m} f_k(\vartheta, \varphi) \right|^2 \quad (22)$$

For a given beam m with an assigned coverage, $\Omega_m$, in the $(\vartheta, \varphi)$ domain, it is convenient to report the minimum $EIRP_m(\vartheta, \varphi)$ within the coverage as $EIRP_m$, $$EIRP_m = \min_{(\vartheta, \varphi) \in \Omega_m} EIRP_m(\vartheta, \varphi) \quad (23)$$

Rendering explicit the feeding coefficients $t_{k,m}$ between the beam input ports and the radiating elements input ports (RE-IP), $$t_{k,m} = \sum_{n=1}^{N_A} \left( h_{k,n} \sqrt{P_n^{SAT}} g_{n,m} \right) =$$

$$= a_m \sum_{n=1}^{N_A} \left( h_{k,n} \sqrt{P_n^{SAT}} c_n b_{n,m} \exp(j\phi_{n,m}) \right) \quad (24)$$

the attention can focus on the optimization of the EIRP, $$EIRP_m(\vartheta, \varphi) = a_m^2 \left| \sum_{k=1}^{N_E} \left( \sum_{n=1}^{N_A} \left( h_{k,n} \sqrt{P_n^{SAT}} c_n b_{n,m} \exp(j\phi_{n,m}) \right) \right) f_k(\vartheta, \varphi) \right|^2 \quad (25)$$

by means of the available degrees of freedom $a_m$, $b_{n,m} \exp(j\phi_{n,m})$, $c_n$.

Once a satisfying solution is found and the required power per amplifier, $P_n^A$, is determined, the amplifiers' biasing conditions are determined with the aim of minimizing the power consumption:

$$(OBO_n, SBO_n) = \operatorname*{argmin}_{OBO_n, SBO_n} W_n^A(OBO_n, SBO_n) \quad (26)$$

subject to $OBO_n \geq OBO_{min}$ $$P_n^A = \frac{P_n^{SAT}}{OBO_n SBO_n}$$

Under the preferred condition of maximum efficiency with prescribed linearity, $$\frac{1}{OBO_{min} SBO_{max}} \leq c_n^2 \sum_{m=1}^{N_B} b_{n,m}^2 a_m^2 \leq \frac{1}{OBO_{min}} \quad (27)$$

and under the simplifying assumption of monotonicity of $W_n^A(OBO_n, SBO_n)$ with respect to the back-offs $OBO_n$, $SBO_n$, we obtain:

$$SBO_n = \frac{1}{OBO_{min} c_n^2 \sum_{m=1}^{N_B} b_{n,m}^2 a_m^2} \quad (28)$$

Finally, in case the technological implementation of the variable bias high power amplifiers doesn't allow for a continuous variation of the levels of the Saturation Back-off, the selected value is chosen as the nearest approximation of the required SBO to the ceiling available value:

$$SBO_n = \lceil SBO_n \rceil_{SBO} \quad (29)$$

In other words, the Saturation Back-Off (SBO) operating point of at least one variable bias high power amplifiers of the plurality of $N_A$ variable bias high power amplifiers (VB-HPA) is calculating by selecting the ceiling value.

The final objective of the optimization is that the amplitude and phase excitations of all the beams are simultaneously optimized in such a way that the radiative performances are met together with the constraint that the load for each amplifier is kept within a range that allow to operate the amplifier with a good DC-to-RF efficiency and the overall RF-Front-End in an optimum DC-to-EIRP efficiency condition.

The amplitude and phase optimization procedure consists in a simultaneous optimization of all the LLRBFN coefficients aiming at meeting edge-of-coverage (EOC) EIRP and beam-to-beam isolation for all the active beams taking into account the constraint on the amplifiers' load. An example of such kind of optimization is presented in the following paragraph. The amplitude and phase optimization, with constrained VB-HPA load, can be managed by means of consolidated optimization tools. Thus, in a further embodiment, the method further comprises a simultaneous optimization of the coefficients controlling the reconfigurable beam forming networks (LLRBFN).

The CPSS (as described above with reference to the embodiment of FIG. 2, but which can also be applied in the embodiment of FIG. 1) regulates the amount of power supplied to each amplifier by varying their bias conditions in accordance with the amplifier load. The power amplifier is designed to maintain their efficiency over a range output power.

In order to assess the advantages of the present invention embodiments, a comparison has been made between some prior art implementations and the present invention embodiments.

Further to known array fed reflector systems with an active control and beam forming approaches, having either an Unconstrained Amplitude and Phase or a Phase Only control, semi-active multi-matrix based systems are also known.

In configuration C (semi-active multi-matrix—unconstrained amplitude and phase), the introduction of a stack of Butler-like hybrid matrices allows a partial reshuffling of the amplitude and phase degrees of freedom at the input of the hybrids with respect to those at radiating element level. Furthermore an appropriate selection of the radiating elements to connect to the hybrids allows achieving an equalization of the powers to be generated by the amplifiers, thus increasing the power efficiency. Full exploitation of the amplitude and phase degrees of freedom is retained with good radiation performances. Losses are introduced proportionally (N×log N) to the order (N) of the hybrids (which are typically composed of directional couplers and waveguide structures realizing proper phase shifts).

Configuration D (Semi-Active Multi-Matrix—Phase Only) is similar to the previous configuration C, but with phase only beam forming. The configuration D showed almost full freedom in power-to-beam allocation. Thanks to an advanced antenna numerical optimization it has been proven possible to achieve good gain maximization while maintaining control of the beam-to-beam isolation. Nevertheless the attractive feature of full power reconfigurability offered by the Semi-Active Multi-Matrix Phase Only (configuration D) is paid in terms of reduced radiation efficiency with respect to the Semi-Active Multi-Matrix Amplitude & Phase (configuration C), which conversely leads to HPAs oversize and then to reduced efficiency of the amplification section. This reduced radiation performance is one of the drawbacks of Multi-Matrix Phase-Only beam-forming, especially in case of use of hybrid matrices of low orders, since the unwanted emissions must be properly controlled in order to avoid the degradation of isolation levels.

|  |  | Conf C | Conf D | Conf E (present invention) |
|---|---|---|---|---|
| TWTA | $\langle G \rangle$ [dBi] | 39.2 | 37.7 | 39.1 |
|  | $P^{RF}_{Tot}/P^{Sat}$ [lin] | 10.9 | 20.2 | 13.7 |
|  | $\langle EIRP \rangle/P^{Sat}$ [dB] | 40.5 | 41.7 | 41.5 |
|  | $P^{DC}_{Tot}/P^{Sat}$ [lin] | 33.6 | 42.3 | 36.5 |
|  | $P^{Diss}_{Tot}/P^{Sat}$ [lin] | 22.8 | 22.1 | 22.8 |
|  | $\eta = P^{RF}_{Tot}/P^{DC}_{Tot}$ | 32% | 48% | 38% |
|  | $\langle EIRP \rangle/P^{DC}_{Tot}$[dB] | 25.2 | 25.5 | 25.9 |
|  | $\langle EIRP \rangle/P^{Diss}_{Tot}$ | 26.9 | 28.3 | 27.9 |
| Flex-TWTA | $P^{DC}_{Tot}/P^{Sat}$ [lin] | 27.4 | 42.3 | 31.9 |
|  | $P^{Diss}_{Tot}/P^{Sat}$ [lin] | 16.6 | 22.1 | 18.2 |
|  | $\eta = P^{RF}_{Tot}/P^{DC}_{Tot}$ | 39% | 48% | 43% |
|  | $\langle EIRP \rangle/P^{DC}_{Tot}$[dB] | 26.1 | 25.5 | 26.5 |
|  | $\langle EIRP \rangle/P^{Diss}_{Tot}$ | 28.3 | 28.3 | 28.9 |

This summary table compares the results of the three different configurations in terms of directivities, power consumptions, EIRPs and power dissipation. Configurations C and D are prior art configurations, used for comparison purposes. Configuration E is an exemplary embodiment according to the present invention.

As expected, the average gain $\langle G \rangle$ is best for configuration C that can exploit all the available degrees of freedom for pattern shaping and it is worst for configuration D that is limited to use only the phase degrees of freedom. The amplitude constraints imposed accordingly to the present invention (i.e. configuration E) do not affect significantly the radiation performance.

Contrarily, configuration D achieves the maximum total RF power ($P^{RF}_{Tot}/P^{SAT}$) and configuration C the worst, with configuration E achieving an intermediate value.

Another interesting quantity to assess is the TWTA power rating necessary to achieve a certain target average EIRP ($\langle EIRP \rangle$). In the table shown above this is quantified by the ratio between the average EIRP and the maximum saturated power of the TWTAs, $\langle EIRP \rangle/P^{SAT}$ With respect to this criterion, the configuration D perform better and configuration C worst. Nevertheless the configuration according to the present invention almost achieve the optimal performances of configuration D. One of the most important figure of merit relates to the DC-to-EIRP efficiency and quantifies the amount of average EIRP that can be obtained consuming the required amount of total DC power $P^{DC}_{Tot}$, it is expressed by the ratio $\langle EIRP \rangle/P^{DC}_{Tot}$. For sake of completeness we compare the three configurations both for conventional TWTAs and for Variable Bias TWTAs. The result is that the configuration proposed accordingly to the invention description outperforms all the others.

Another important figure of merit relates to the power dissipation and can be quantified in terms of the amount of average EIRP that can be obtained dissipating a required amount of power $P^{Diss}_{Tot}$, it is expressed by the ratio $\langle EIRP \rangle/P^{Diss}_{Tot}$. Also in this case, for sake of completeness we compare the three configurations both for conventional TWTAs and for Variable Bias TWTAs. The result is that also for this figure of merit, the configuration proposed accordingly to the invention description outperforms all the others.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A reconfigurable RF front-end circuit for a multi-beam array fed reflector antenna system having a first plurality of $N_B$ input beam signals and a second plurality of $N_E$ radiating elements (RE), the front-end circuit comprising a reconfigurable beam forming network (LLRBFN), having a set of $N_B$ input ports and distributing each input port signal to a plurality of $N_A$ output ports with phase and amplitude control; a plurality of $N_A$ high power amplifiers (HPA) connected to the plurality of $N_A$ output ports of the reconfigurable beam forming network (LLRBFN); an output network (ONET, OSN), arranged for recombining signals output by the high power amplifiers (HPA) and feeding the recombined signals to the second plurality of $N_E$ radiating elements (RE), wherein the high power amplifiers (HPA) are variable bias high power amplifiers (VB-HPA) and further comprising a set of channel amplifiers (CA) each connected to one of the set of $N_B$ input ports of the reconfigurable beam forming network (LLRBFN).

2. The reconfigurable RF front-end circuit according to claim 1, wherein the variable bias high power amplifier (VB-HPA) is a flexible solid-state power amplifier (flex-SSPA).

3. The reconfigurable RF front-end circuit according to claim 1, wherein the variable bias high power amplifier (VB-HPA) is a variable bias travelling wave tube amplifier (flex-TWTA).

4. The reconfigurable RF front-end circuit according to claim 1, wherein the reconfigurable beam forming network (LLRBFN) comprises a plurality of signal dividers (SD) for distributing each input port signal to a plurality of $N_A$ signal channels, each signal channel further comprising a phase weighting element (WE PHI) and an amplitude weighting element (WE AMP), and a plurality of $N_A$ signal combiners (SC) for combining the signal channels into the plurality of $N_A$ output ports.

5. The reconfigurable RF front-end circuit according to claim 1, further comprising a control and power sub-system (CPSS) connected to the reconfigurable beam forming network (LLRBFN) and the variable bias high power amplifiers (VB-HPA).

6. The reconfigurable RF front-end circuit according to claim 1, wherein the output network (ONET, OSN) comprises 4×4 hybrid matrices.

7. The reconfigurable RF front-end circuit according to claim 1, wherein the reconfigurable beam forming network (LLRBFN) is a digital beam forming network.

8. A multi-beam array fed reflector antenna system comprising a first plurality of $N_B$ input beam signal inputs, an RF front-end circuit according to claim 1, and further comprising a reflector receiving radiated signals from the second plurality of $N_A$ radiating elements (RE).

9. A method of operating a reconfigurable RF front-end circuit for a multi-beam array fed reflector antenna system having a first plurality of $N_B$ input beam signals and a second plurality of $N_E$ radiating elements (RE), the front-end circuit comprising a reconfigurable beam forming network (LLRBFN), having a set of $N_B$ input ports and distributing each input port signal to a plurality of $N_A$ output ports with phase and amplitude control; a plurality of $N_A$ high power amplifiers (HPA) connected to the plurality of $N_A$ output ports of the reconfigurable beam forming network (LLRBFN); an output network (ONET, OSN), arranged for recombining signals output by the high power amplifiers (HPA) and feeding the recombined signals to the second plurality of $N_E$ radiating elements (RE), wherein the high power amplifiers (HPA) are variable bias high power amplifiers (VB-HPA) and further comprising a set of channel amplifiers (CA) each connected to one of the set of $N_B$ input ports of the reconfigurable beam forming network (LLRBFN), the method comprising controlling a bias condition of each of the variable bias high power amplifiers (VB-HPA) individually.

10. The method according to claim 9, wherein the bias condition is controlled to vary a saturation back-off (SBO) parameter according to an actual power requirement of each of the variable bias high power amplifiers (VB-HPA) individually, the saturation back-off parameter (SBO) being defined as the ratio of a maximum achievable saturation power to an adjustable saturation power.

11. The method according to claim 10, wherein the saturation back-off (SBO) parameter for each of the plurality of $N_A$ variable bias high power amplifiers (VB-HPA) is equal to or lower than a maximum saturation back-off parameter value (SBOmax).

12. The method according to claim 9, wherein the bias condition is controlled to vary an output back-off (OBO) parameter for each of the variable bias high power amplifiers (VB-HPA) individually, the output back-off parameter (OBO) being defined as the ratio of an adjustable saturation power to the actual output power.

13. The method according to claim 12, wherein the output back-off (OBO) parameter of the plurality of $N_A$ variable bias high power amplifiers (VB-HPA) is equal to or higher than a minimum output back-off parameter value (OBOmin).

14. The method according to claim 13, wherein the saturation back-off parameter for each of the plurality of $N_A$ variable bias high power amplifiers (VB-HPA) is set according to $$SBO_n = \frac{1}{OBO_{min} c_n^2 \sum_{m=1}^{N_B} b_{n,m}^2 a_m^2}$$

wherein n denotes an index for each of the plurality of $N_A$ variable bias high power amplifiers (VB-HPA), m denotes an index for each of the plurality of $N_B$ input beams, is the gain contribution of the respective channel amplifier CA, is the gain contribution of the respective reconfigurable beam forming network (LLRBFN), and is the gain contribution of the variable bias high power amplifier (VB-HPA).

15. The method according to claim 9, further comprising a simultaneous optimization of the coefficients controlling the reconfigurable beam forming networks (LLRBFN).

* * * * *